(12) United States Patent
Ertl et al.

(10) Patent No.: US 6,197,097 B1
(45) Date of Patent: Mar. 6, 2001

(54) APPARATUS FOR CLEANING AN AIRSTREAM

(75) Inventors: Harald Ertl, Geretsried; Johann Goebel, Munich; Sabine Kunz, Bad Rappenau, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/321,784

(22) Filed: May 27, 1999

(30) Foreign Application Priority Data

May 27, 1998 (DE) .............................. 198 23 611

(51) Int. Cl.$^7$ .................................................. B01D 53/04
(52) U.S. Cl. ............................... 96/143; 96/129; 96/130; 96/146
(58) Field of Search ................. 95/96–106, 114, 95/115; 96/122–130, 143–146

(56) References Cited

U.S. PATENT DOCUMENTS

| 2,639,000 | * | 5/1953 | Edwards | 96/125 |
| 4,259,092 | * | 3/1981 | Matsuo et al. | 96/125 X |
| 4,269,611 | * | 5/1981 | Anderberg | 96/124 |
| 4,391,616 | * | 7/1983 | Imamura | 96/125 X |
| 4,479,361 | * | 10/1984 | Osher | 96/146 X |
| 4,871,607 | | 10/1989 | Kuma et al. | 428/186 |
| 5,064,453 | * | 11/1991 | Jacquish | 96/127 X |
| 5,110,328 | * | 5/1992 | Yokota et al. | 96/126 X |
| 5,308,457 | * | 5/1994 | Dalla Betta et al. | 96/144 X |
| 5,827,355 | * | 10/1998 | Wilson et al. | 95/114 |
| 5,879,432 | * | 3/1999 | Morlec et al. | 95/114 |
| 5,912,423 | * | 6/1999 | Doughty et al. | 96/143 X |
| 5,980,612 | * | 11/1999 | Kelly | 95/114 X |

FOREIGN PATENT DOCUMENTS

| 2512659 A1 | * | 5/1976 | (DE) | 96/129 |
| 3935656 | | 5/1990 | (DE) . | |
| 4021072 | | 1/1992 | (DE) . | |
| 4129069 | | 3/1992 | (DE) . | |
| 19546672 | | 6/1997 | (DE) . | |
| 1310011 | | 3/1973 | (GB) . | |
| 56-015820 | * | 2/1981 | (JP) | 96/125 |

OTHER PUBLICATIONS

Article entitled: "Rotoradsorber zur Abluftreinigung und Lösungsmittel–Rückgewinnung"; pp. 321–331, by Konrad et al., Chem. Ing. Tech. 66 (1994) Nr.3.

* cited by examiner

Primary Examiner—Robert H. Spitzer
(74) Attorney, Agent, or Firm—W. F. Fasse; W. G. Fasse

(57) ABSTRACT

A filter for cleaning air by removing noxious and/or odorous matter from the air flow by desorption is constructed so that filter sections (12) can be sequentially heated for a desorption of the noxious and odorous matter. An air discharge (13) for desorption air is provided on the air exit side (11) of the filter (2) for the discharge of the desorbed noxious and odorous matter, preferably into the combustion air of an engine. The air discharge (13, 22) for the desorption air covers at least one filter section 12 at a time when that section is being heated. A relative motion between the filter sections (12) and the air discharge (13) assures that other filter sections keep filtering while at least one filter section at a time is regenerated.

18 Claims, 1 Drawing Sheet

APPARATUS FOR CLEANING AN AIRSTREAM

PRIORITY CLAIM

This application is based on and claims the priority under 35 U.S.C. §119 of German Patent Application 198 23 611.5, filed on May 27, 1998, the entire disclosure of which is incorporated herein by reference.

FIELD OF THE INVENTION

The invention relates to an apparatus for cleaning an airstream to remove noxious substances and odor causing matter, especially from air circulating through a passenger carrying compartment. The apparatus includes a filter capable of adsorbing noxious and odorous matter by desorption to thereby regenerate the filter.

BACKGROUND INFORMATION

German Patent Publications DE 39 35 656 A1; DE 41 29 069 A1 and DE 19 546 672 A1 disclose devices for cleaning an airstream. These devices include an endless filter belt running over two rollers arranged in parallel inside of chambers through which the filter belt travels and wherein the filter belt is heated for desorption of noxious and odorous matter. Conventionally it is necessary to simultaneously desorb noxious and odorous matter from the entire volume of the filter before the filter can again be exposed to the air flow to be cleaned for again loading the filter belt with noxious and odorous matter. Simultaneously desorbing the entire filter belt is not efficient. Another drawback is seen in the fact that the quantity of adsorbing medium is limited due to the need for minimizing the pressure loss caused by the airstream passing through the filter belt. Satisfying these conditions becomes more and more difficult the larger the volume of the airstream to be cleaned and/or the larger the loading degree of noxious and odorous matter becomes. Thus, there is room for improvement.

It is further known to use two filters which are exposed to the air to be cleaned alternately. Thus, one filter does the cleaning job while the other filter is being desorbed or vice versa. Such structures require a relatively large structural volume for the two separate filters. Such space is frequently not available, especially in a passenger vehicle for removing noxious and odorous matter from the passenger compartment space, or rather from the air circulating in the passenger compartment.

OBJECTS OF THE INVENTION

In view of the foregoing it is the aim of the invention to achieve the following objects singly or in combination:

- to provide a small volume apparatus for cleaning an airstream by removing noxious and odorous matter by desorption;
- to make sure that even a high degree of noxious and odorous matter in a filter is completely removed;
- to expose filter sections sequentially to desorption while other filter sections are simultaneously working to clean an airstream; and
- to move the filter relative to a desorption device or vice versa while heating at least sections of the filter for the removal of noxious and odorous matter.

SUMMARY OF THE INVENTION

According to the invention a filter for cleaning an airstream by removing noxious and odorous matter by thermal desorption to thereby regenerate the filter is characterized in that filter sections are heatable one after the other for the desorption of the noxious and odorous matter. An air exit side of the filter is provided with an air discharge for removing the desorbed noxious and odorous matter. The air discharge is so arranged that its cross-sectional flow area overlaps or at least coincides with the flow area of at least one currently heated filter section.

According to the invention at least one filter section at a time is exposed to the airstream to be cleaned also during the desorption so that there is no need to move the filter into or through a special chamber where it would not be exposed to the airstream to be cleaned. Thus, the invention avoids a desorbing chamber, thereby reducing the volume of the apparatus without reducing its efficiency.

By aligning the air discharge for removing desorbed matter sequentially with at least one filter section after another through relative movement between the air discharge and the filter, one filter section after another is desorbed while simultaneously being exposed to the airstream to be cleaned. The present filter does not require to be run over continuously rotating rollers so it is not necessary to make the filter as an endless belt, whereby the advantage is obtained that the filter itself can be pleated to thereby increase the available filter surface area. Preferably, the pleats run across the relative motion direction. Furthermore, the effective filter surface area can be substantially increased while maintaining a minimal structural volume of the entire apparatus. The enlarged pleated filter surface area is capable of adsorbing a respectively large quantity of noxious and odorous matter without causing any significant pressure drop in the air flow to be cleaned as it passes through the filter for the adsorption of the noxious and odorous matter.

As mentioned, either the filter or the air discharge is made movable for movement relative to the other component. Thus, for example the filter may be arranged in a rectangular stationary frame while the air discharge is movable from filter section to filter section or the air discharge may be stationary and the filter sections are moved stepwise into register with the discharge port for the desorption. In another embodiment each filter section can be provided with a temporarily effective air discharge in a sequential order so that there is practically no relative movement.

The velocity of the relative movement between filter section and the air discharge is controllable in closed loop fashion either in response to the volume of the air flow to be cleaned or in response to the degree of loading of noxious and odorous matter in the air flow or in response to both of these factors air volume and loading. The sequential formation of air discharge channels in stationary positions over or on at least one filter section at a time is similarly controllable in closed loop fashion.

The sequential heating of the filter sections can be accomplished, for example by a heat radiating source such as a microwave source or an infrared radiation source. In a preferred embodiment the heat source is integrated into the movable air discharge. In the embodiment with a microwave heat source the filter is preferably made of a filter material capable of absorbing microwaves.

In the embodiment with an electric filter heater it is preferred that the filter material itself is electrically conductive or equipped with an electrical conductor that is heatable. The electrical resistance heater can for example be provided as a wire mesh that carries the filter material in a surface area distribution or the filter material may be integrated into the wire mesh electric resistance heater. However, it is preferred that the filter material itself, namely the adsorption material, is made of an electrically conductive material capable of simultaneously working as a heater and as a filter in order to keep the thermal mass of the filter as small as possible.

An electrically conductive filter material is preferably made of carbon fibers woven into a textile fabric. It has been found that a textile fabric made of regenerated cellulose fibers can be readily converted into a carbon fiber fabric by oxidation, for example of a viscous silk also known as rayon. British Patent 1,310,011 describes, for example the production of such a carbon fiber fabric.

The apparatus of the invention is suitable for cleaning any airstream of noxious and odorous matter. However, the primary application of the present apparatus is for cleaning an airstream that is to enter the interior of a passenger space such as a compartment in a passenger vehicle, in an aircraft or in a train. However, the use of the present apparatus, for example for air-conditioning purposes in buildings is also possible.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
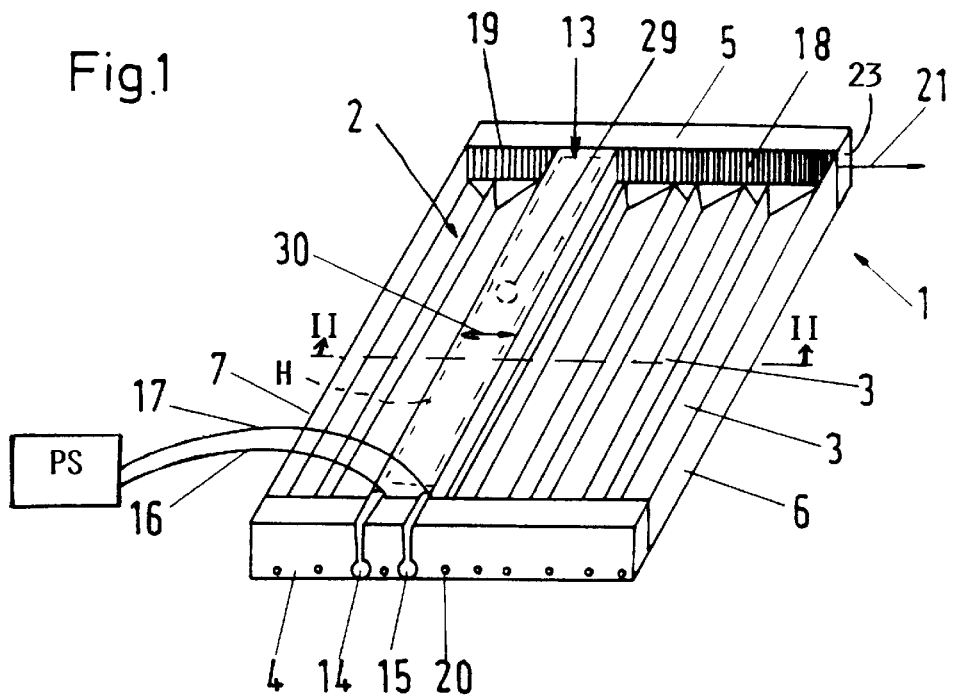
FIG. 1 is a perspective view of a first embodiment of a filter according to the invention combined with a movable exhaust operating as a heater and as an air discharge.
Figure 2:
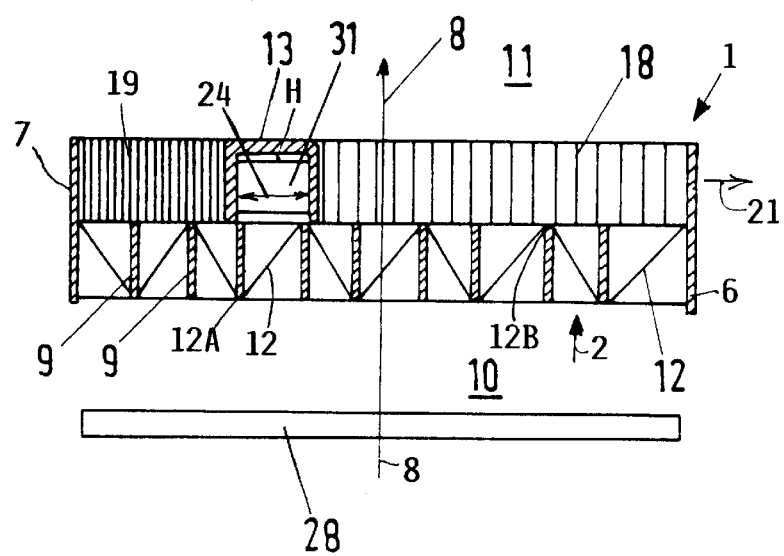
FIG. 2 is a sectional view along line II—II in FIG. 1.

FIGS. 1 and 2 show a filter frame 1 surrounding a filter 2 having pleats 3 of filter material. The frame 1 has four sections 4, 5, 6 and 7. At least one frame section 5 is hollow to form an air flow channel 23 for discharging an airstream 21 carrying desorbed matter, as will be described in more detail below. The filter 2 is for example a carbon fiber fabric that is pleated to form the pleats 3 extending between two frame end sections 4 and 5 and two longitudinal filter frame side sections 6 and 7.

As best seen in FIG. 2, an air flow 8 carrying noxious and odorous matter to be cleaned out of the air flow passes, preferably first through a preliminary filter 28 and then through the filter 2 according to the invention, whereby the air flow enters into the entrance side 10 of the filter and exits on the exit side 11 of the filter 2. The filter 2 adsorbs the noxious and odorous matter into the filter fabric. Preferably, the filter is divided by separation walls 9 extending in parallel to the filter frame side wall sections 6 and 7 and perpendicularly to the end frame side sections 4 and 5. The separation walls 9 also extend in parallel to the air flow 8 to be cleaned.

As best seen in FIG. 2, the filter cloth or fabric is held in its pleated configuration by the separation walls 9 which hold the filter cloth in a zig-zag configuration to form filter sections 12. The air passing through any of the individual filter sections 12 is individually heatable for desorption as will be described in more detail below.

The separation walls 9 are, for example made of metal and are connected to electrical contacts 20 shown in FIG. 1 at the outer side of the frame end section 4 facing the viewer. Thus, an electrical contact is established between the separation walls 9 and the pleat edges 12A and 12B of the pleated filter cloth or fabric 2. Each individual filter section 12 can be electrically heated by sequentially passing an electric heating current through neighboring separation walls 9 forming a pair. The individual sequential heating of the filter sections 12 has the advantage that desorption can be applied to the filter sections 12 individually without withdrawing the entire filter from its filtering operation. Thus, the noxious and odorous matter is desorbed individually from each filter section 12 while air to be cleaned flows through that filter section and all other filter sections. For this purpose in one embodiment of the invention an air discharge 13 forming a desorption channel is movable along the frame end sections 4 and 5 in parallel to and sequentially over each filter section 12. The interior of the air discharge 13 forms an air flow discharge channel 31 having a width 24, in the direction crosswise to the filter pleats 3, which is large enough to cover or overlap at least one filter section 12 at a time. However, the width 24 may be made larger so that two or more filter sections 12 can be simultaneously desorbed and regenerated without interrupting the filtering operation.

The desorption air flow discharge channel 31 in the air discharge 13 is movable back and forth as indicated by the double arrow 30 in FIG. 1. This arrow represents, for example, a stepping motor secured to either the frame 1 for moving the air discharge 13 relative to the frame or secured to the discharge for moving the frame or to a fixed point for moving either the frame 1 or the discharge 13. Any conventional drive may be used for this purpose. Another drive may comprise a stepwise operable piston cylinder device.

In operation, when the air discharge 13 is stopped, heat is supplied to the filter section 12 over which the air discharge 13 has stopped. A heater H is provided for this purpose. The heater H may be energized in various ways, for example through flexible electrical conductors 16 and 17 connecting a power source PS through slide contacts 14 and 15 to heater contacts 20. When the air discharge 13 stops, the slide contacts 14, 15 rest on two heater power supply contacts 20 connected to the electrically conducting separation walls 9, for example to heat the respective filter section 12 between the pleat edges 12A and 12B. Thus, the feed advance of the air discharge 13 and the heating of the filter sections are synchronized with each other. More specifically, the air discharge 13 always stops over a filter section 12 that is being heated.

As seen in FIG. 2, the air discharge 13 is open downwardly so that air passing through the respective heated filter section 12 can enter into the air flow discharge channel 31 formed by the air discharge 13 for air discharge through the channels 31 and 23 as indicated by the arrow 21 in FIG. 1. As mentioned, the width 24 is at least large enough to cover the spacing between two neighboring separation walls 9 to thereby at least register or overlap with the respective filter section 12. The sliding contacts 14 and 15 connected to the power supply conductors 16 and 17 are so spaced from one another that their feed advance will always match two neighboring heater contacts 20 for heating the respective filter section 12 as described above. While it is convenient for enforcing the required synchronization between the sequential heating of the filter sections 12 with the feed advance of the air discharge 13, by moving the sliding contacts 14 and 15 with the air discharge 13, it is also possible to heat the filter sections 12 in a timed sequence that is also imposed on the stepwise motion of the air discharge 13.

The volume of the air carrying desorbed noxious and odorous matter and passing through the channels 31 and 23 as indicated by the arrow 21 is preferably controlled in a closed loop manner as a proportion of the total air throughput or volume through the venting system, for example of a vehicle and in response to the temperature of the desorption air 21 in the air discharge channel 23. The desorption temperature or rather the heating temperature of the individual filter sections 12 is controlled in response to the air volume passing through the filter and/or passing through the heater section.

The channel 31 of the air discharge 13 is open at least at one end to communicate with the air discharge channel 23 formed in the frame end section 5. In order to permit this communication between the channels 31 and 23 and to also permit the motion back and forth as indicated by the arrow 30 in FIG. 1, the viewer facing wall of the frame end section 5 is provided in the form of bellows wall sections 18 and 19. The section 18 of the bellows wall extends between the frame side wall section 6 and the air discharge 13. The bellows wall section 19 extends between the frame side section 7 and the side wall of the air discharge 13. As the air discharge 13 moves from right to left in FIGS. 1 and 2, the pleats in the wall section 18 widen while the pleats in the wall section 19 become narrower as shown in FIG. 2. When the air discharge 13 moves from left to right in FIG. 2, the reverse is true. These bellows wall sections 18 and 19 are so dimensioned, that the air discharge 13 can be moved close to the left hand side wall 7 or close to the right-hand side wall 6 while simultaneously assuring the proper enclosure of the channel 23 except where the channel 23 communicates with the channel 31. The desorbed noxious and odorous material carried by the airstream 21 through the channel 23 is, for example supplied to the combustion air of the engine of the vehicle in which the present filter is installed.

Instead of the bellows type wall sections 18 and 19 it is possible to use other flexible or position variable wall components that permit the movement of the air discharge 13 relative to the channel 23 while maintaining communication between the two channels 31 and 23. Flaps and/or a flexible lamellae systems may be used to form at least one wall of the frame section 5 to enclose the channel 23 in a manner that permits the required relative movement between the air discharge 13 and 23 while maintaining the communication between the channels 23 and 31. For example the flaps would be closed to the right and left of the channel 13 while being open where one channel end of the air discharge 13 communicates with the channel 23.

Instead of providing direct communication between the channels 12 and 23, it is possible to provide a separate air withdrawal hose 29 as shown in dashed lines in FIG. 1. The hose 29 is preferably connected to a suction source not shown. The hose 29 would be sufficiently flexible to permit the relative movement range between the filter 2 and the air discharge 13 for the removal of the desorbed noxious and odorous matter.

In operation, the adsorption of noxious and odorous matter takes place in all sections 12 of the filter 2 except the section 12 that is currently being heated where desorption takes place for removal of the noxious and odorous matter by an air flow that is part of the air to be cleaned. When the desorption in one section is completed, relative movement between the filter frame 1 and the air discharge 13 is accomplished to desorb the next filter section and so on until the desorption channel contacts one end wall section 6 or the other end wall section 7. A new cycle then begins by a respective relative movement in the opposite direction for regenerating the filter 2.

Figure 3:
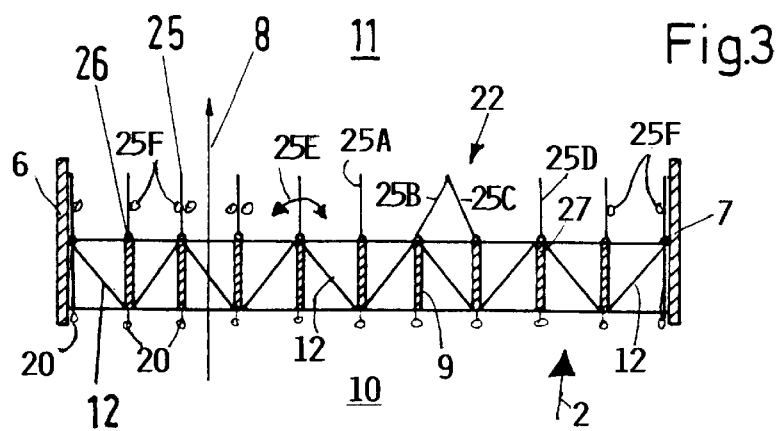
FIG. 3 is a view similar to that of FIG. 2, however showing a different embodiment of a filter with an air discharge sequentially formed by tiltable flaps.

FIG. 3 shows an embodiment of a filter desorption apparatus according to the invention in which each filter section 12 can be sequentially covered by flaps 25 to form an air discharge channel 22 on the air exit side 11 of the filter 2. The flaps 25 are hinged by hinges 26 to the exit edges of the separation walls 9. The filter fabric passes through a slot 27 in the respective separation wall 9 below the hinge 26. Thus, again the pleated zig-zag configuration of the filter sections 12 is accomplished as in FIG. 2. However, the air discharge 13 has been replaced by the channel 22.

The channel 22 is formed by the clockwise tilting of the flap 25B and the counterclockwise tilting of the flap 25C whereby the channel 22 is closed upwardly, but open downwardly into the respective filter section 12. The channel is also closed at its end for example by a filter frame wall and a discharge hose 29 may be provided as shown by a dashed line in FIG. 1 for the removal of air from the channel 22. The preceding channel was formed by the flaps 25A and 25B. The next channel will be formed by the flaps 25C and 25D and so forth in response to the operation of a flap drive 25E shown symbolically by a double arrow.

When the filter cloth itself is constructed as an electrical resistance heater of carbon fiber material, it is possible to heat the filter sections 12 sequentially to red heat in order to combust noxious or odorous matter that cannot be desorbed and are irreversibly held in the filter. Further, the filter may hold catalytically effective materials.

When the filter fabric itself is an electric resistance heater power may be supplied through contacts 20 and the electrically conducting separation walls 9 as shown in FIG. 3. In a modification, the flaps may carry resistance heaters 25F which are energized depending on whether the flaps assume a closed position for heating or an open position not for heating.

As mentioned above, a prefilter 28 may be positioned on the air entrance side 10 of the filter 2, whereby the filter 28 can adsorb noxious and odorous materials that are not adsorbable by the filter 2. The filter 28 may also be constructed to convert noxious and/or odorous matter that normally is not adsorbable by the filter 2 into matter that can be adsorbed by the filter 2. Another function of the prefilter 28 is a more even distribution or smoothing of peaks of noxious or odorous matter in the air 8 onto all filter sections 12.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for cleaning an airstream, comprising a filter (2) including filter sections (12) having an air entrance side (10) and an air exit side (11), a heater (H) for heating at least one filter section (12) at a time for desorbing noxious and odorous matter from said at least one filter section, an air discharge (13, 22) covering said at least one filter section (12) at a time on said air exit side (11) for removing desorbed noxious and odorous matter when said at least one filter section (12) is being heated, wherein said air discharge comprises a first air channel (31) extending in parallel to at least one of said filter sections (12) and a second air channel (23) extending perpendicularly to said first air channel (31) and perpendicularly to said filter sections (12), said second air channel (23) comprising two bellows wall sections (18, 19) movably connecting one end of said first air channel (31) to said second air channel (23) for discharging an air stream (21) from said first air channel (31) through said second air channel (23).

2. The apparatus of claim 1, wherein said filter (2) comprises pleats (3), and wherein each filter section (3) comprises at least one pleat (3).

3. The apparatus of claim 1, wherein said heater (H) is an electrical resistance heater for heating said filter sections (12) at least one at a time.

4. The apparatus of claim 1, wherein said heater (H) is a radiation source for heating said filter sections (12) at least one at a time.

5. The apparatus of claim 4, wherein said radiation source (H) is secured to said air discharge (13).

6. The apparatus of claim 1, comprising means (30) operatively connected for causing relative movement between said filter (2) and said air discharge.

7. The apparatus of claim 6, wherein said means (30) for causing said relative movement comprise a stepping motor connected to said air discharge (13) for stepwise moving said air discharge (13) along said filter sections (12), and wherein said filter (2) is stationary.

8. The apparatus of claim 1, wherein said heater (H) comprises electrically conducting resistor material forming at least part of said filter (2), and further comprising electrical contacts (20) connected to said filter sections (12) for supplying electrical power to at least one of said filter sections (12) at a time, and wherein said at least one filter section is covered by said air discharge (13) when said at least one filter section is being heated.

9. The apparatus of claim 8, wherein said electrically conducting material of said filter (2) forming said heater (H) is a fabric made of carbon fibers.

10. The apparatus of claim 8, wherein said air discharge (13) comprises means (30) for moving said air discharge (13) stepwise along said filter sections (12), said air discharge (13) further comprising sliding power supply contacts (14, 15) positioned for sequential cooperation with said electrical contacts (20) of said filter sections (12).

11. The apparatus of claim 8, wherein said filter (2) comprises pleats (3) having pleat edges and wherein said electrical contacts (20) are arranged to contact said pleat edges.

12. The apparatus of claim 11, further comprising separation walls (9), and wherein said electrical contacts (20) are constructed as at least part of said separation walls (9).

13. The apparatus of claim 1, wherein said heater comprises an electrical resistance heater (H) positioned for sequentially heating at least one of said filter sections (12) at a time, electrical contacts (20) connected to said electrical resistance heater for supplying electrical power to said electrical resistance heater for heating said filter sections (12) at least one at a time.

14. The apparatus of claim 13, wherein said electrical resistance heater is mounted to said air discharge (13), wherein said air discharge (13) comprises means (30) for moving said air discharge and said heater (H) stepwise along said filter sections (12), said air discharge (13) further comprising sliding contacts (20) positioned for cooperation with a power supply (PS) for energizing said electrical resistance heater (H).

15. An apparatus for cleaning an airstream, comprising a filter (2) including filter sections (12) having an air entrance side (10) and an air exit side (11), a heater (H) for heating at least one filter section (12) at a time for desorbing noxious and odorous matter from said at least one filter section, an air discharge (13, 22) covering said at least one filter section (12) at a time on said air exit side (11) for removing desorbed noxious and odorous matter when said at least one filter section (12) is being heated, wherein said air discharge (22) comprises a plurality of flaps (25), a hinge (26) securing each flap to said filter sections (12) on said air exit side (11), and a drive (25E) connected to said flaps (25) for tilting two neighboring flaps toward each other for enclosing an air discharge channel (22).

16. The apparatus of claim 15, further comprising separation walls (9) separating said filter into said filter sections (12), and wherein each separation wall carries one said hinge (26) along said air exit side (11) for hinging a respective flap (25) to each separation wall (90).

17. The apparatus of claim 15, wherein said heater comprises an electrical resistance wire heater (25F) carried by each of said flaps (25).

18. The apparatus of claim 17, further comprising heater power supply contacts 20 so positioned in said filter that a power supply is switched on for said wire heater (25F) when two neighboring flaps (25) are tilted toward each other to form said air discharge channel and switched off, when said flaps (25) are moved into a position parallel to an air flow (8) through said filter-sections (12).

* * * * *